US008048346B2

(12) United States Patent
Murphy

(10) Patent No.: US 8,048,346 B2
(45) Date of Patent: Nov. 1, 2011

(54) SEPTIC TANK FABRICATION SYSTEM

(76) Inventor: Mark W. Murphy, Cottage Grove, OR (US)

( * ) Notice: Subject to any disclaimer, the term of this patent is extended or adjusted under 35 U.S.C. 154(b) by 871 days.

(21) Appl. No.: 11/388,935

(22) Filed: Mar. 24, 2006

(65) Prior Publication Data

US 2007/0221819 A1 Sep. 27, 2007

(51) Int. Cl.

| | |
|---|---|
| ***B28B 7/30*** | (2006.01) |
| ***E04B 1/16*** | (2006.01) |
| ***B29C 39/04*** | (2006.01) |
| ***B29C 33/76*** | (2006.01) |

(52) U.S. Cl. .......... 264/31; 249/177; 249/184; 264/313; 264/317; 425/59

(58) Field of Classification Search ................ 249/1, 63, 249/64, 139, 155, 160, 177, 184; 264/31, 264/32, 33, 34, 313, 317; 425/59, 436 R, 425/DIG. 105

See application file for complete search history.

(56) References Cited

U.S. PATENT DOCUMENTS

| | | | | | |
|---|---|---|---|---|---|
| 760,912 | A | * | 5/1904 | McNeil | 249/184 |
| 808,846 | A | * | 1/1906 | Johnson et al. | 249/184 |
| 815,447 | A | * | 3/1906 | Lucas | 249/186 |
| 828,418 | A | * | 8/1906 | Myers | 249/184 |
| 850,667 | A | * | 4/1907 | Mitchell | 249/184 |
| 856,852 | A | * | 6/1907 | Dorward | 249/184 |
| 927,806 | A | * | 7/1909 | Laughlin | 249/184 |
| 1,219,272 | A | * | 3/1917 | Edison | 264/31 |
| 1,579,634 | A | * | 4/1926 | Bidwell | 249/1 |
| 2,485,850 | A | * | 10/1949 | Sitton | 249/159 |
| 2,539,741 | A | * | 1/1951 | Hayes | 249/97 |
| 2,683,298 | A | | 7/1954 | Fadden | |
| 2,777,185 | A | * | 1/1957 | Wehrung | 249/145 |
| 2,799,911 | A | | 7/1957 | Hutchins et al. | |
| 2,894,311 | A | | 7/1959 | Sinclair | |
| 3,163,910 | A | | 1/1965 | Greene | |
| 3,167,838 | A | | 2/1965 | Bergsten et al. | |
| 3,206,532 | A | | 9/1965 | Nottingham et al. | |
| 3,539,146 | A | | 11/1970 | Smith | |
| 3,643,908 | A | | 2/1972 | Laing | |
| 3,687,597 | A | | 8/1972 | Lavergne, Jr. | |
| 3,990,673 | A | | 11/1976 | Jones et al. | |
| RE31,753 | E | * | 12/1984 | LaVergne, Jr. | 264/250 |
| 4,614,326 | A | | 9/1986 | Strickland et al. | |
| 4,826,644 | A | * | 5/1989 | Lindquist et al. | 264/71 |
| 5,126,095 | A | * | 6/1992 | Crosno et al. | 264/516 |
| 2008/0011757 | A1 | * | 1/2008 | Wheeler | 220/567.1 |

FOREIGN PATENT DOCUMENTS

GB 2065736 A * 7/1981

OTHER PUBLICATIONS

Excerpt from Wolfe et al., Puzzlers' Tribute: A Feast for the Mind, Dec. 2001, AK Peters, pp. 7-8.*

* cited by examiner

*Primary Examiner* — Joseph Del Sole
*Assistant Examiner* — Ryan Ochylski
(74) *Attorney, Agent, or Firm* — Chernoff, Vilhauer, McClung & Stenzel

(57) ABSTRACT

A system for fabricating a septic tank using an outer mold and an inner removable plug, between which hardenable fluid material is poured. Preferably, the plug and mold are positioned with respect to one another in a manner that permits a septic tank to be fabricated in a single pour.

13 Claims, 5 Drawing Sheets

SEPTIC TANK FABRICATION SYSTEM

BACKGROUND OF THE INVENTION

The present invention pertains to a system for fabricating septic tanks.

Septic tanks typically must be built to conform to regulations promulgated by one or more respective governmental entities such as state governments, city governments and other such municipalities, etc. These governmental regulations seek to ensure that septic tanks used in commercial or residential construction are structurally sound and are accessible for maintenance. For example, many jurisdictions have standards setting the amount of fluid pressure that commercial and residential septic tanks must be capable of withstanding. Conformance with these standards is usually tested by filling a finished septic tank with an amount of water sufficient to provide the pressure that the septic tank must be built to withstand.

Existing concrete septic tanks are typically formed by pouring concrete into an outer mold, and around an interior plug positioned within the mold. In order to facilitate the bulk fabrication of septic tanks, it is desired that both the outer mold and the inner plug be reusable to permit multiple concrete castings, thus reducing the cost of fabricating septic tanks. For example, U.S. Pat. No. 3,990,673 to Jones et al. and U.S. Pat. No. 3,687,597 to Lavergne Jr. each disclose respective reusable systems in which the inner plug and the outer mold may be detached from the hardened concrete septic tank. Though detachment of the outer mold from the hardened concrete is easily accomplished, detachment of the inner plug is often complicated. First, to facilitate removal of the plug from the interior of the hardened concrete casting, only five sides of the septic tank are poured using the aforementioned mold and plug assembly, with the remaining side poured separately, as will be later described. Once the concrete surrounding the plug has hardened, the plug must be detached from the five faces of the concrete tank and removed through the open side. Detachment of the plug from the concrete casting in which it is encased may involve either overcoming a substantial amount of friction generated over the large surface area where the plug and the concrete press against each other, or alternatively, some systems, such as the aforementioned patent to Jones et al., employ a complicated structure by which the inner mold is collapsed inward, and away from the concrete walls to avoid the resisting friction on the plug.

Once the plug has been removed, a cover (or top) of the septic tank is secured to the remainder of the tank enclosure. The cover is typically formed by pouring concrete into another mold that provides for an opening through the cover so that the interior of the finished septic tank may be accessed for maintenance.

Unfortunately, pouring a septic tank using the previously described prior art reusable mold and plug systems produces a finished septic tank that often fails to meet the required standards for fluid pressure containment. Specifically, when the tanks are tested by filling them with water to a required pressure, leakage occurs at the junction between the cover and the poured five-sided enclosure. Essentially, the economic incentive to reuse a plug, which dictates that the poured enclosure have an open side for removing the plug, weakens the septic tank structurally at the connection between that poured enclosure and the separately-poured cover.

What is desired, then, is a system for pouring septic tanks that includes a reusable plug and that produces a poured septic tank having improved structural strength over septic tanks fabricated using existing systems.

The foregoing and other objectives, features, and advantages of the invention will be more readily understood upon consideration of the following detailed description of the invention, taken in conjunction with the accompanying drawings.

DETAILED DESCRIPTION

Figure 1:
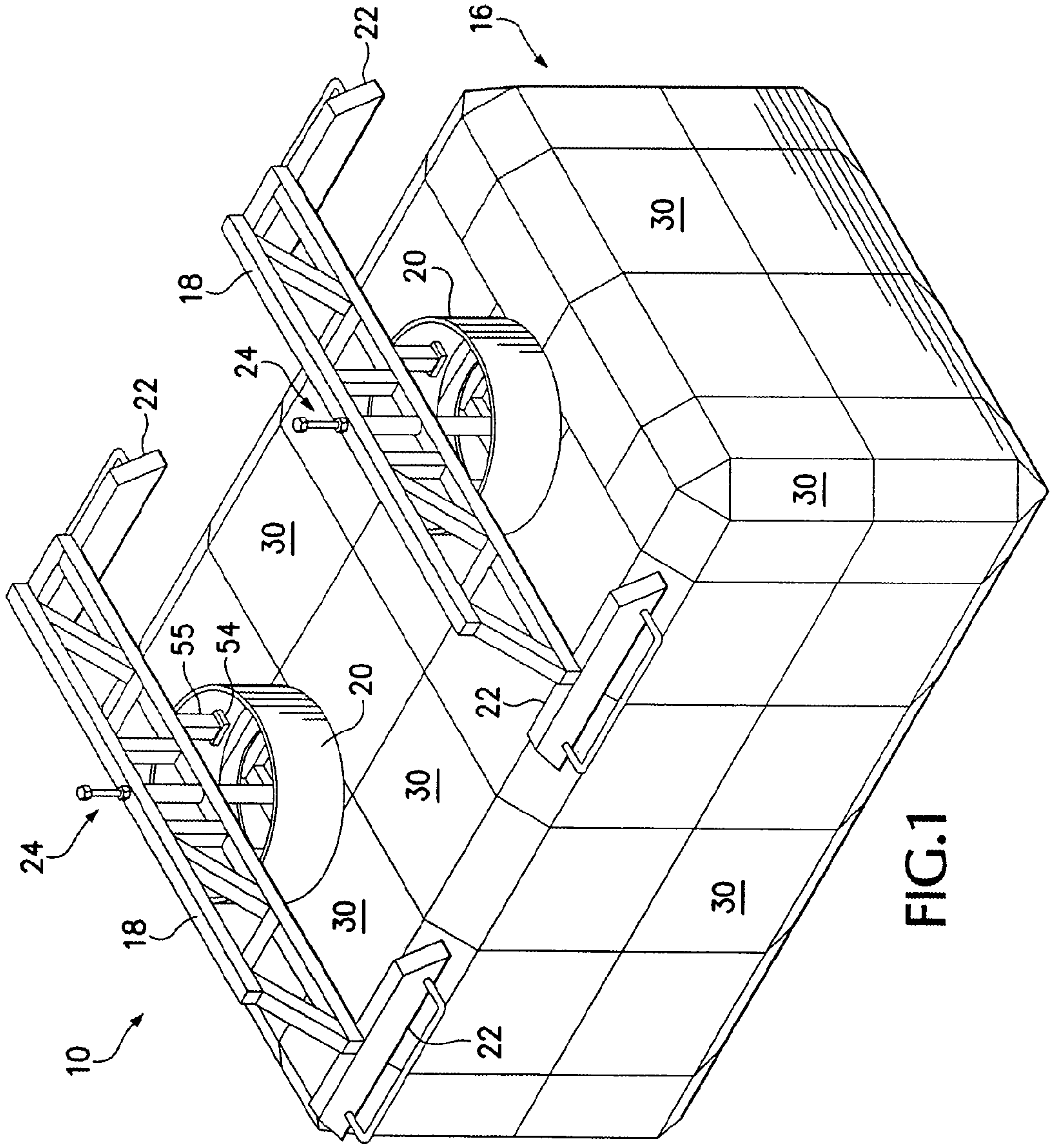
FIG. 1 shows a perspective view of a plug and truss assembly for an exemplary septic tank fabrication system.
Figure 2:
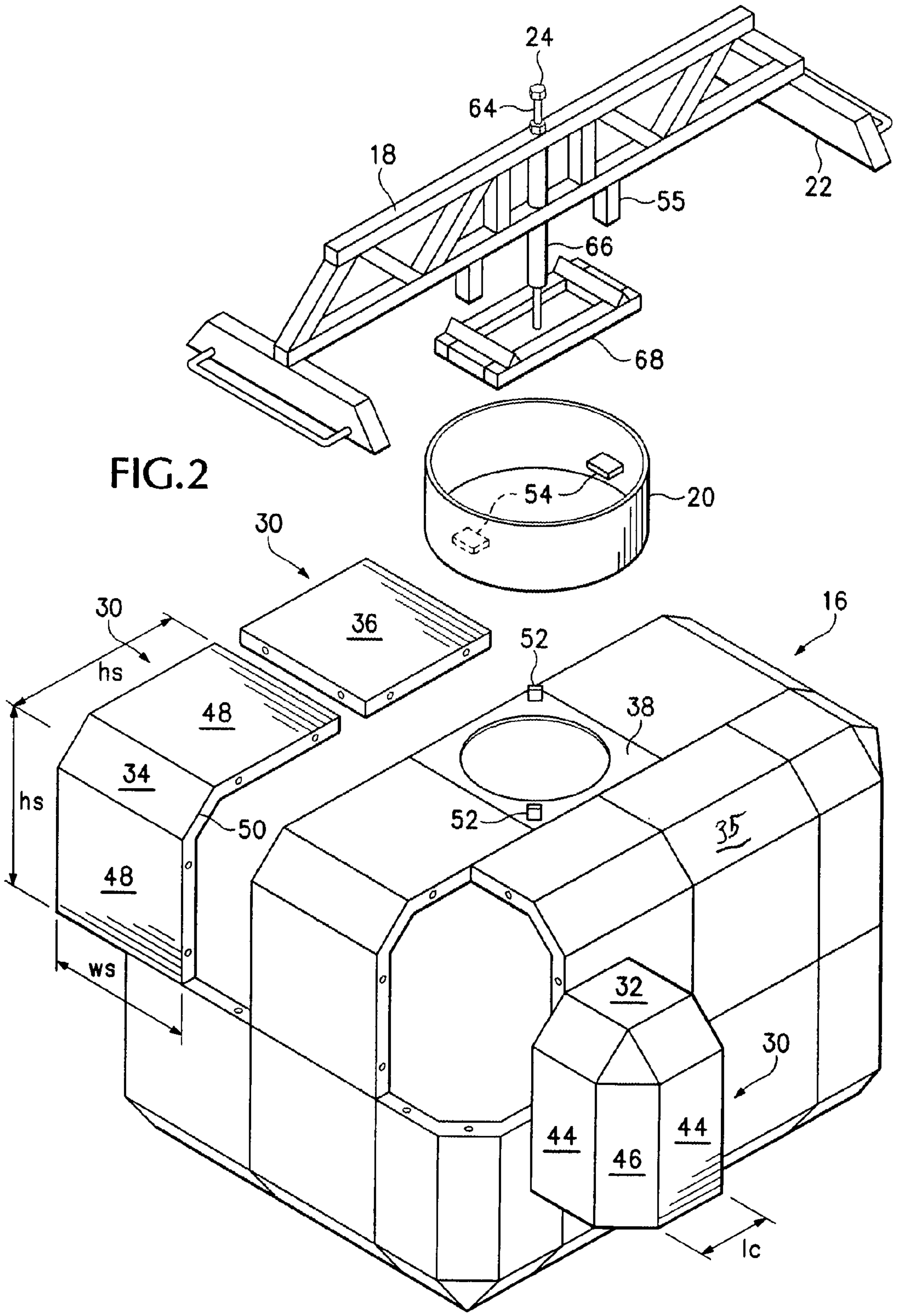
FIG. 2 shows an exploded partial view of the plug and truss assembly of FIG. 1.
Figure 3:
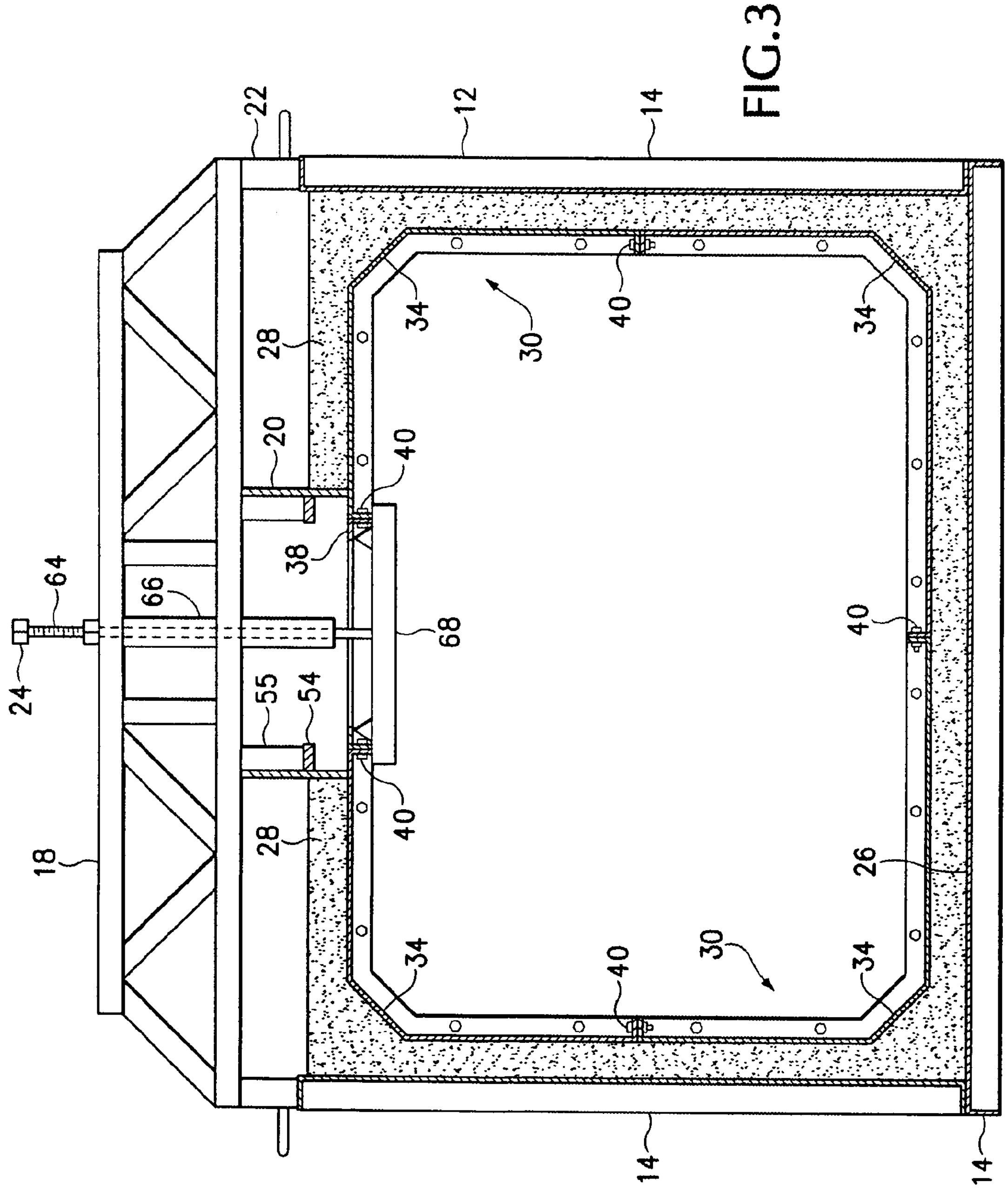
FIG. 3 shows a sectional view of an exemplary septic tank fabrication system having the plug and truss assembly of FIG. 1 along with an outer mold and poured concrete between the plug and the mold.

Referring to FIGS. 1-3, an exemplary septic tank fabrication system may include a plug and truss assembly 10 and an outer mold 12 (shown in FIG. 3) surrounding the plug and truss assembly 10. The outer mold 12 in one embodiment may be fashioned of multiple walls 14 forming a five-sided enclosure that may be positioned around the plug and truss assembly 10. In another embodiment, as further described later in this specification, the outer mold 12 may simply be the walls of a hole in the ground. It should also be understood that, although the plug and truss assembly 10 and the outer mold 12 are each of a substantially rectangular or cubical construction, and thus forming a box-like septic tank, alternate embodiments of the disclosed septic tank fabrication system may utilize molds and plug assemblies of other desired shapes, e.g. cylindrical, spherical, etc.

Preferably, the plug and truss assembly 10 includes a plug 16, one or more trusses 18, and one or more retaining members 20 that in the disclosed plug and truss assembly 10 are shown as hoops having a circular cross section. Alternatively, the retaining members 20 may be of any other desired shape, such as square, etc. Preferably, each hoop 20 is positioned between a respective truss 18 and the plug 16, and the truss 18 preferably includes arms 22 that may rest on the outer mold 12. Each truss 18 may include a positioning mechanism 24 that operates to adjust the height of the plug 16 with respect to the bottom surface 26 of the outer mold 12, which may be a wall 14, the bottom surface of a hole in the ground, etc. Thus, the positioning mechanism 24 is used to lift the plug with respect to the outer mold so that concrete 28, when poured in the gap between the plug 16 and the outer mold 12 as shown in FIG. 3, forms a septic tank in a single pour.

Figure 5:
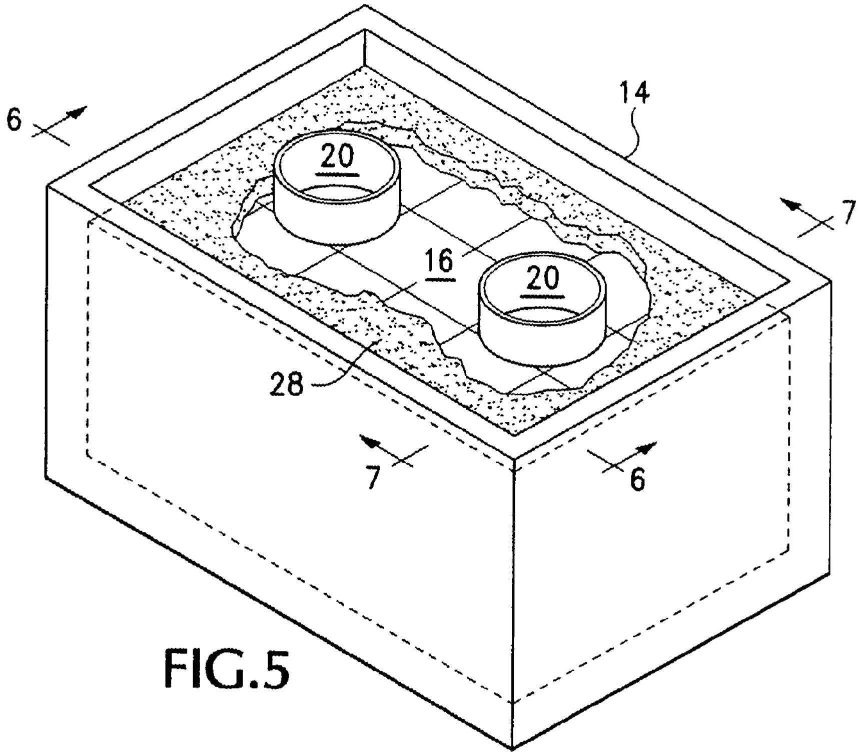
FIG. 5 shows a schematic illustration of an exemplary septic tank fabrication system as concrete is being poured to form a septic tank.
Figure 6:
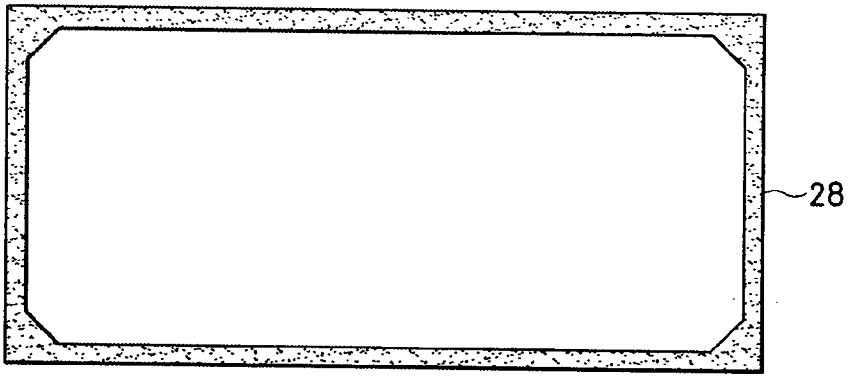
FIG. 6 is a cross section of the exemplary septic tank fabrication system of FIG. 5 taken along line 6-6.
Figure 7:
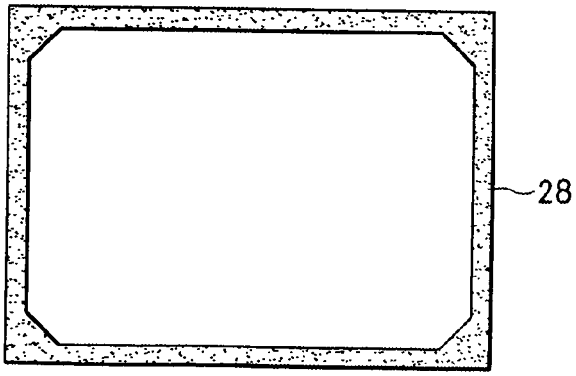
FIG. 7 is a cross section of the exemplary septic tank fabrication system of FIG. 5 taken along line 7-7.

Referring specifically to FIGS. 5 through 7, fluid concrete or other hardenable material may be poured into the aforementioned exemplary septic tank fabrication system such that the fluid concrete 28 or other hardenable material flows beneath the plug 16, begins to rise along the sides of the plug 16, and finally begins to flow over the top of the plug 16. At that time, the poured fluid concrete 28 will have two cross sections, as seen in FIGS. 6 and 7, respectively, each mutually perpendicular to each other, and each self bounded. The fluid concrete will then flow around the hoops 20 and may then be allowed to harden. Once hardened, the fluid material, such as concrete, will form an integral septic tank enclosure that will not be weakened by a joint between an open-ended enclosure and a separately-formed cover. Thus, a septic tank fabricated using the disclosed system will be more durable and better able to withstand both testing and operational fluid pressures.

Figure 4:
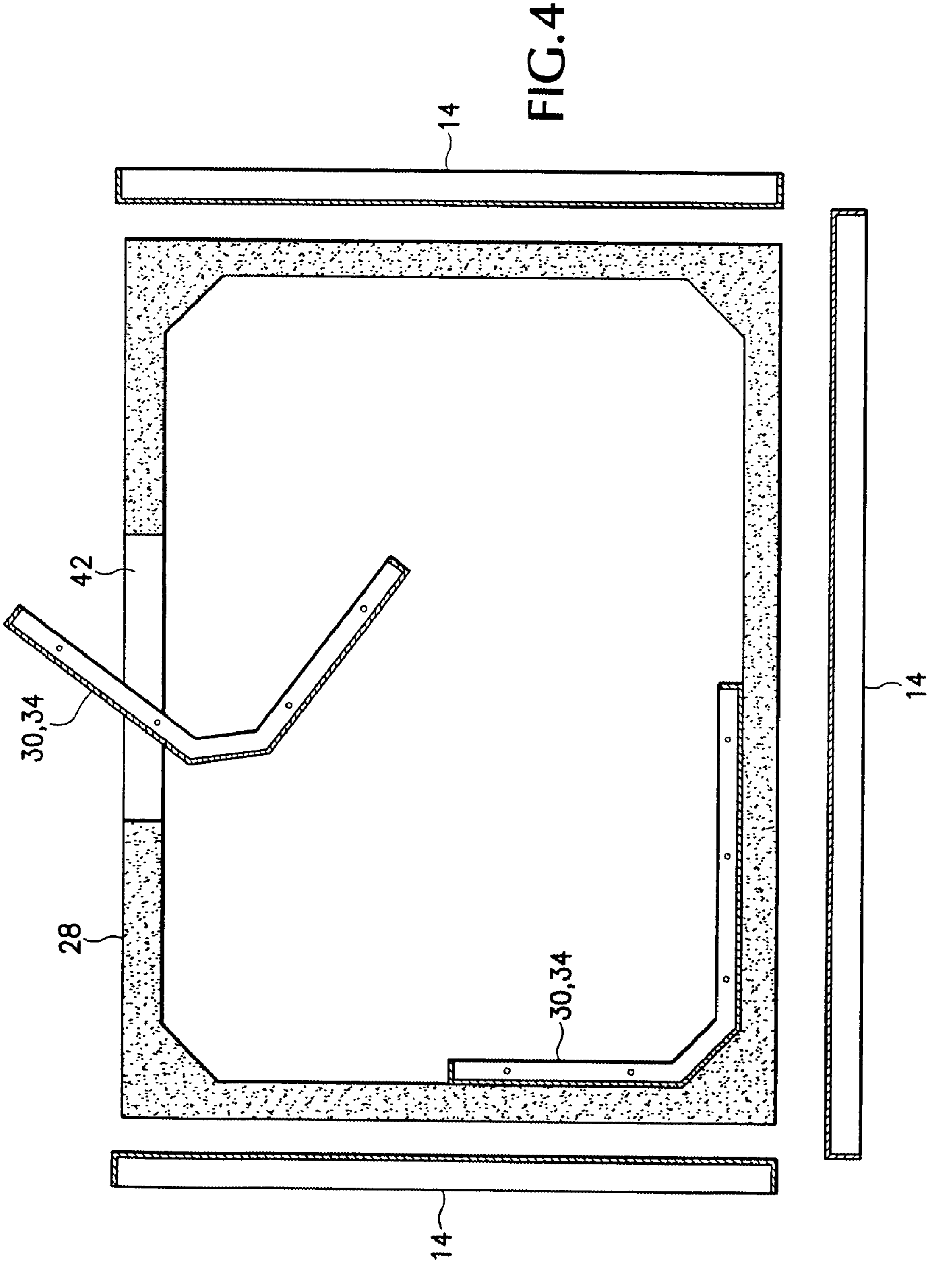
FIG. 4 shows a sectional view of a hardened septic tank fabricated using the septic tank fabrication system of FIG. 1 illustrating the removal of an outer mold and an inner plug from the hardened septic tank.

Furthermore, the plug 16 may be of a type that can be reused. Referring to FIGS. 2 and 4, the plug and truss assembly 10 may comprise individual panels 30 that are each of a size that fits within the opening 42 of the septic tank formed by a respective hoop 20. The disclosed plug 16 includes panels 30 of several shapes. For example, the plug 16 may comprise corner panels 32, side panels 34, corner panels 35, top panels 36, as well as aperture panels 38 over which a respective hoop 20 may rest as concrete is poured. Each of the panels 30 may be selectively, detachably secured to one or more other panels 30 to form the plug 16. The panels 30 may be secured to each other using any suitable means, such as bolts 40.

The respective hoops 20 preferably have a diameter (or other dimension if a non-circular retaining member 20 is used) of a size so that the periphery of the hoop 20 extends beyond that of the aperture panel 38. As can be seen in FIG. 4, this ensures that the aperture panel 38, when disassembled from the other panels 30, may fit through one of the concrete openings 42 of the septic tank 28 that is formed by a respective hoop 20. Similarly, each of the panels 30 may preferably be small enough to fit through an opening 42 of the septic tank 28. It should be understood that, although the disclosed plug 16 comprises individual panels, each selectively, detachably securable to one another, and each sized to fit through an opening 42 of the septic tank, other such systems may include some panels 30 that are of a size that do not fit through an opening 42. In that instance, though some panels may remain in the interior of the septic tank, the panels 30 that are removed can be reused and therefore increase the economic efficiency by which multiple septic tanks may be fabricated.

One preferred embodiment of the disclosed exemplary septic tank system utilizes an assembled plug having exterior dimensions of 110 inches length, 69 inches width, and 56 inches height. In this embodiment, each corner panel 32 has two perpendicular sides 44, each having height of 28 inches and a 10 inch length $l_c$ and connected together by a beveled corner 46, so as to form a panel having a substantially U-shaped cross section. Each side panel 34 is substantially L-shaped in cross section, with two perpendicular sides 48 connected by a beveled section 50, so that the side panel 34 has a width $w_s$ of 20.5 inches and a height and length $h_s$ each of 28 inches. The L-shaped cross section of the side panels and the U-shaped cross section of the corner panels each give the respective panels around the top periphery of the plug 16 an overhanging center of gravity in the assembled plug 16. Thus, when a person is disassembling the plug 16, each of those upper side and corner panels will conveniently tilt downwards and inwards once separated from their neighboring panels, facilitating separation and removal of the individual panels from the hardened septic tank around the outer periphery of the plug 16. Similarly, end panels 35 also have an L-shaped cross section, but compared to the side panels 34, have a shorter top-section length of 10 inches, matching that of a corner panel 32. Each of the top panels 36 are 20.5 inches square, as are the aperture panels 38 which each define an opening 42. The aperture panels 38 may include tabs 52 that each help retain the hoop 20 in position around the opening 42. Similarly, the hoop 20 may include tabs 54 upon which spacers 55 on a respective truss 18 may rest. Each of the panels 30 may be formed of any suitable material, such as steel, but are preferably made of a lightweight material such as aluminum or a fiber-reinforced composite material.

One novel feature of the disclosed exemplary septic tank system is that the plug 16 may be assembled to enclose an arbitrary volume by utilizing more or less panels than that shown in FIG. 1, whose size is described in the preceding paragraph. As can easily be seen from FIG. 2, for example, if a septic tank of a larger volume is desired, more side panels 34 may simply be inserted into the plug 16 to increase the length and/or the width of the plug 16. Similarly, the addition of top panels 36 between respective top and bottom side panels 34 around the lateral periphery of the plug 16 would increase the height of the plug 16, if desired. Thus, the disclosed exemplary septic tank system is not only economically efficient in that it may be reused, it also is efficient in that it obviates the need to have plugs or plug molds of different sizes in inventory.

The outer mold 12 may comprise five walls 14 attached together to form an open-ended enclosure. Once the concrete 28 or other hardenable material poured inside the mold 12 and around the plug 16 has set, each of the walls 14 may be detached from its neighboring walls 14 and removed form the outer periphery of the septic tank. The outer mold 12 may comprise any appropriate material, such as iron, steel, aluminum, fiber-reinforced composite, etc.

Referring to FIGS. 2 and 3, the truss assembly 18 may include two lateral support arms 22 at each end of the truss assembly 18. The truss assembly 18 may also include a positioning mechanism 24 comprising a threaded bolt 64 rotatably mounted in a mating sleeve 66 and having a planar flanged end 68 secured to its lower end. As can be seen in FIG. 3, each respective truss 18 may be mounted onto the plug 16 so that each lateral arm 22 of a respective truss 18 rests on a side of the outer mold 12. The flanged end 68 is inserted through the opening 42 so as to engage the upper interior surface of the plug 16 around the periphery of the opening 42. In this configuration, rotation of the threaded bolt 64 will raise the plug 16 relative to the bottom of the mold 12 between a first, upper position where the hoop 20 presses against the truss 18 and a lower position where the plug 16 rests on the lower wall 14 of the mold 12. In this manner, the vertical position of the plug 16 may be adjusted relative to the mold 12 so as to permit fluid material such as concrete 28 to flow both beneath and above the plug 16, and form a septic tank in a single pour. Adjustment of the height of the plug 16 may also be used to determine the thicknesses of the top and bottom portions of the septic tank, as well. An alternate configuration could rotatably secure the bolt 64 of the truss 18 to a fixed support above the plug and truss assembly 10 and an outer mold 12.

Another novel feature of the disclosed exemplary septic tank system is that a septic tank could simply be poured in the ground. In this embodiment, a hole is dug that then serves as the outer mold to the plug and truss assembly 10. The plug 16 is assembled, either in the hole itself or lowered into the hole after being assembled. The truss assemblies 18 are then used to raise the plug 16 relative to the hole and concrete 28 is poured into the hole and around the plug 16. Once the concrete 28 sets, a person can then climb inside the septic tank and disassemble the plug 16, removing each panel 30 from the septic tank through the opening 42.

It will be understood to those familiar in the art that the foregoing description of a septic tank fabrication system is exemplary only, and the members and methods described therein can be easily modified in scale and configuration. For example, the panels 32 and 34, described as having generally U-shaped and L-shaped cross sections, respectively, can be modified to be larger and/or have cross sections of other shapes. Moreover, though the preceding description of an exemplary method for fabricating a septic omitted discussion of forming required inlet and outlet valves for a formed septic tank, such details are well known to those skilled in casting septic tanks.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of fabricating a septic tank, said method comprising pouring hardenable fluid material around a plug and within a mold, where said plug is at an elevated position with respect to a lower surface of said mold, such that said septic tank may be fabricated in a single pour so as to have a vertical cross-section that forms a self-bounded loop, where a brace member positioned vertically above said plug both maintains said elevated position and holds said plug in a submerged position, while said plug is immersed in said hardenable fluid material, where said brace member may be separated from said plug after said hardenable fluid material has hardened, and where at least one retaining member adjacent a surface of said plug causes said fluid material to form an opening into said septic tank, where said plug is assembled from a plurality of panels, and said method further comprising the step of disassembling said plug after said fluid material has hardened and removing said panels from the interior of said septic tank through said opening

2. The method of claim 1 where said mold comprises a hole in the ground.

3. The method of claim 1 where said septic tank has a horizontal cross-section that forms a self-bounded loop.

4. The method of claim 1 where said plug may be assembled to enclose a selected one of a plurality of available volumes by choosing a desired numerical quantity of panels used to assemble said plug.

5. The method of claim 1 where said brace member includes a flange portion that engages with an interior surface of said plug to detachably secure said plug to said brace member at said elevated position while said fluid material is poured around said plug.

6. The method of claim 5 where said brace member includes an adjustment mechanism capable of variably establishing said elevated position of said plug with respect to said mold.

7. A method of fabricating a septic tank, said method comprising the steps of:

(a) digging a hole in the ground;

(b) inserting a plug member into said hole at an elevated position with respect to the bottom surface of said hole, said plug member having a first, upwardly directed surface and a second, downwardly directed surface; and (c) pouring hardenable fluid material around said plug so as to harden over at least a portion of said upwardly directed surface and at least a portion of said downwardly directed surface, where a brace member positioned vertically above said plug both maintains said elevated position and holds said plug in a submerged position while said plug is immersed in said hardenable fluid material such that said brace member may be separated from said plug after said hardenable fluid material has hardened.

8. The method of claim 7 including the steps of:

(a) waiting for said hardenable fluid material to harden; and (b) thereafter, removing said plug from an interior of said septic tank.

9. A method of fabricating a septic tank, said method comprising pouring hardenable fluid material around a plug and within a mold, where said plug is at an elevated position with respect to a lower surface of said mold, such that said septic tank may be fabricated in a single pour that extends beneath, around, and above said plug, where a brace member positioned vertically above said plug both maintains said elevated position and holds said plug in a submerged position while said plug is immersed in said hardenable fluid material such that said brace member may be separated from said plug after said hardenable fluid material has hardened, where at least one retaining member adjacent a surface of said plug causes said fluid material to form an opening into said septic tank, where said plug is assembled from a plurality of panels, and said method further comprising the step of disassembling said plug after said fluid material has hardened and removing said panels from the interior of said septic tank through said opening.

10. The method of claim 9 where said mold comprises a hole in the ground.

11. The method of claim 9 where said plug may be assembled to enclose a selected one of a plurality of available volumes by choosing a number of panels used to assemble said plug.

12. The method of claim 9 where said brace member includes a flange portion that engages with an interior surface of said plug to detachably secure said plug to said brace member at said elevated position while said fluid material is poured around said plug.

13. The method of claim 12 where said brace member includes an adjustment mechanism capable of adjusting said elevated position of said plug with respect to said mold.

* * * * *